(No Model.) 6 Sheets—Sheet 1.

E. BLANCHARD.
GRAIN ELEVATOR.

No. 590,084. Patented Sept. 14, 1897.

WITNESSES.
Julius Lutz.
Isaac B. Orens.

INVENTOR:
E. Blanchard
BY
ATTORNEYS

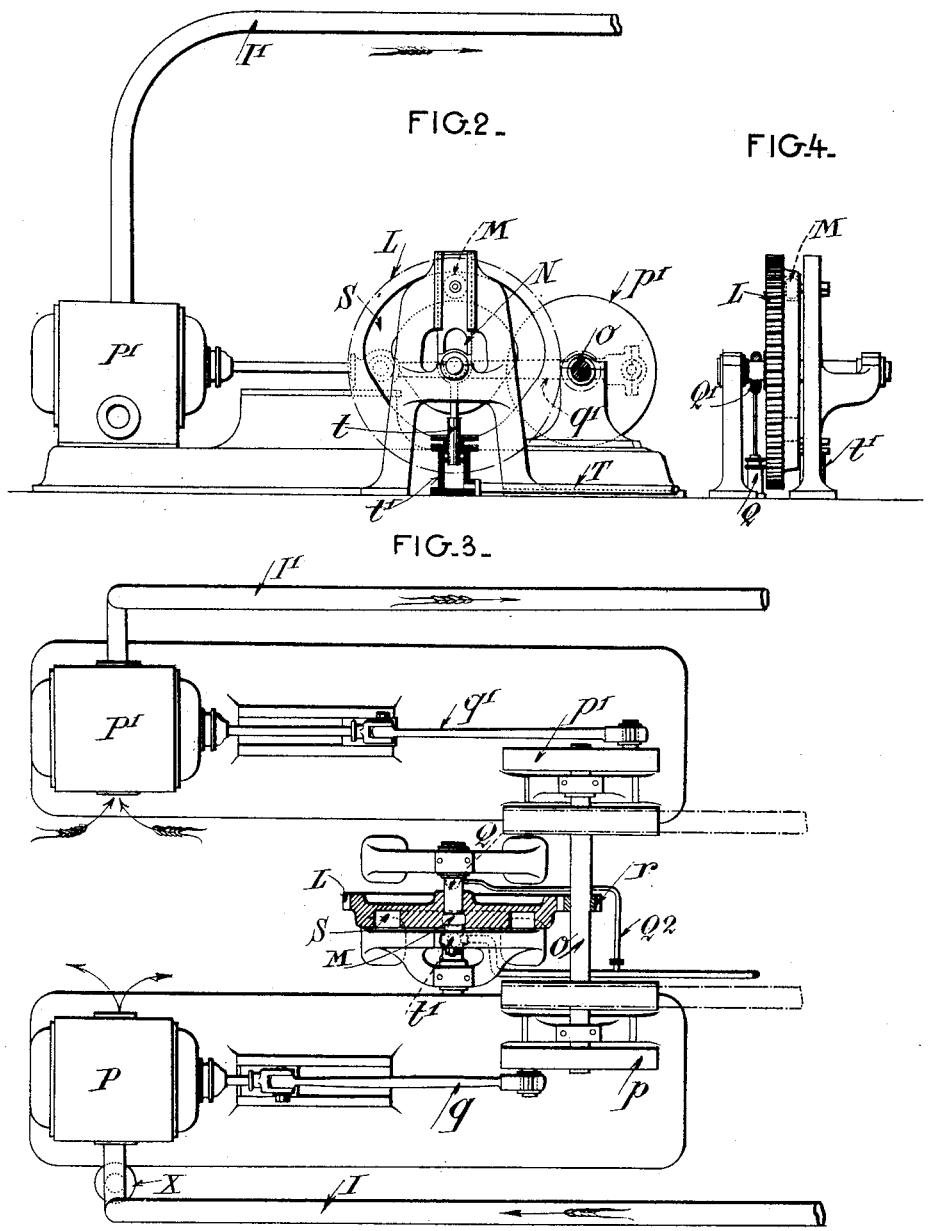

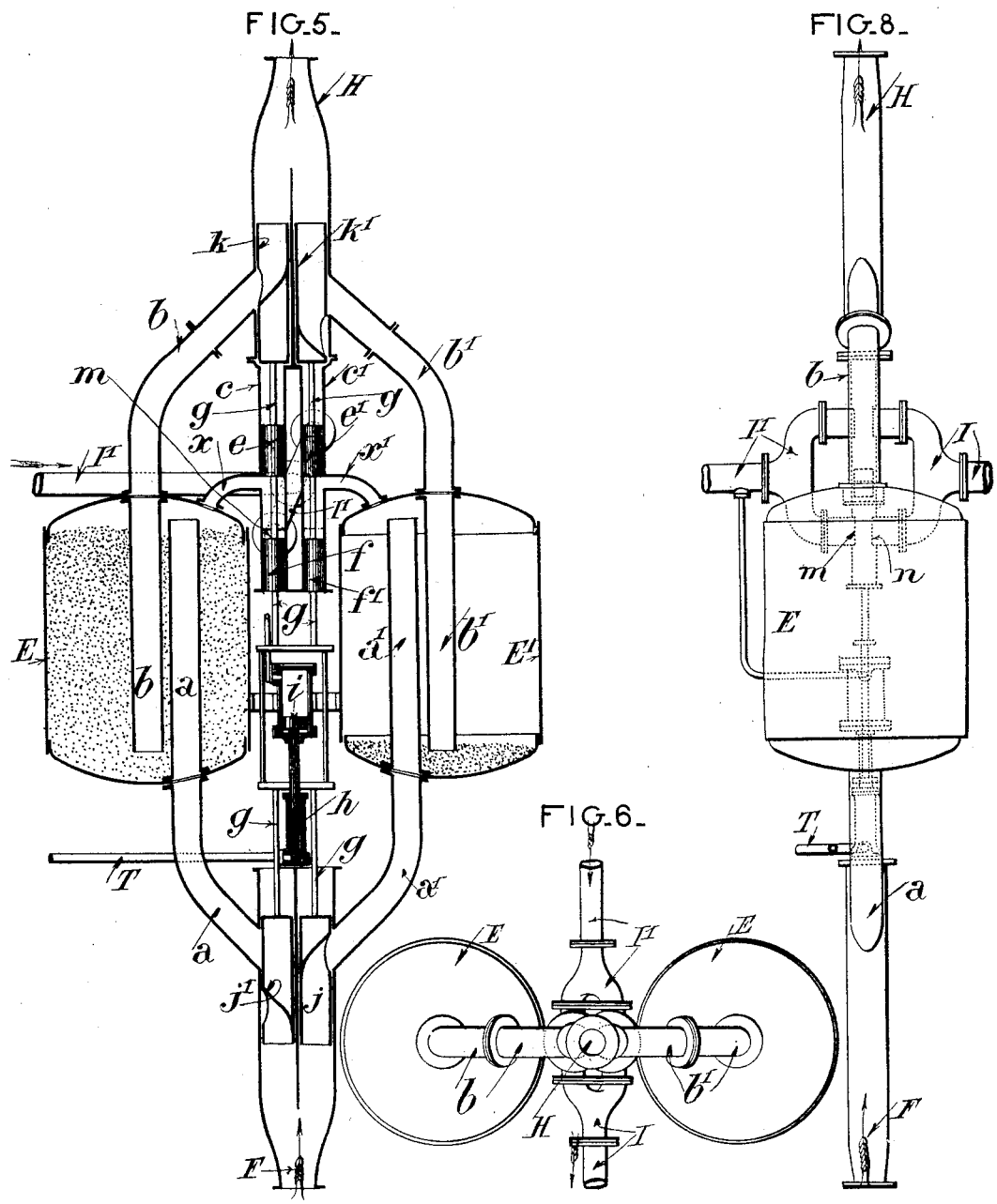

(No Model.) 6 Sheets—Sheet 4.

E. BLANCHARD.
GRAIN ELEVATOR.

No. 590,084. Patented Sept. 14, 1897.

WITNESSES.
Julius Lutz.
Isaac B. Owens.

INVENTOR:
E. Blanchard
BY
ATTORNEYS.

(No Model.) 6 Sheets—Sheet 5.

E. BLANCHARD.
GRAIN ELEVATOR.

No. 590,084. Patented Sept. 14, 1897.

WITNESSES.
Julius Lutz
Isaac B. Owens

INVENTOR:
E. Blanchard
BY
ATTORNEYS (No Model.) 6 Sheets—Sheet 6.
E. BLANCHARD.
GRAIN ELEVATOR.
No. 590,084. Patented Sept. 14, 1897.
FIG. 12.
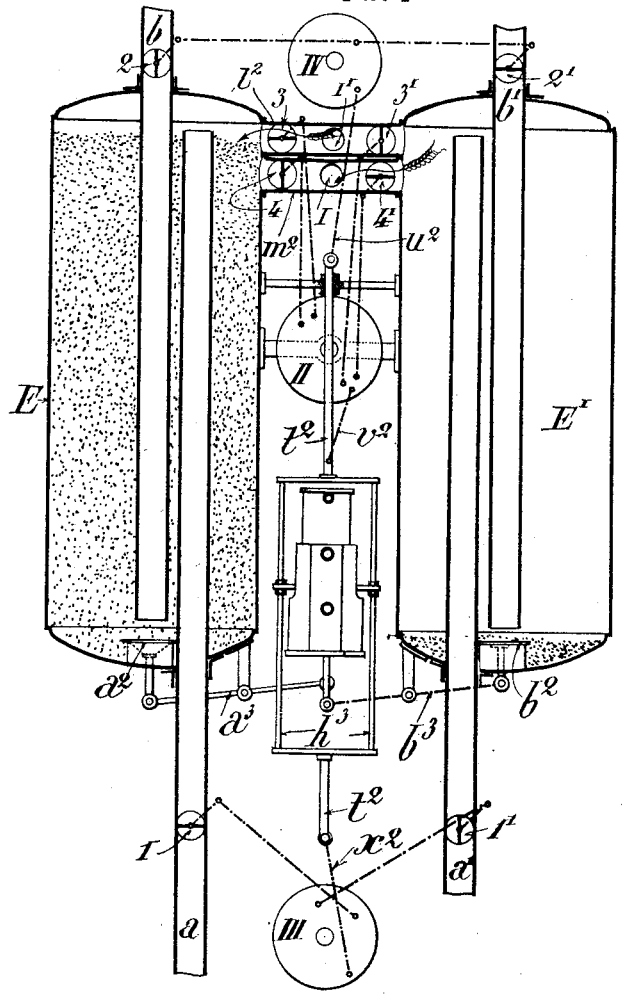
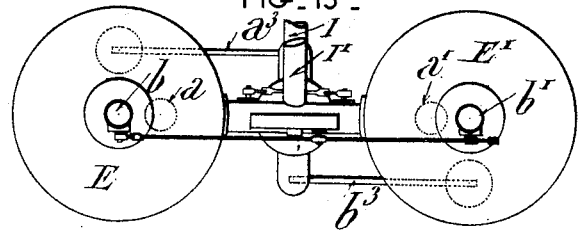
FIG. 13.
WITNESSES.
Julius Lutz.
Isaac B. Owens.
INVENTOR:
E. Blanchard
BY
Munn
ATTORNEYS.

UNITED STATES PATENT OFFICE.

EMILE BLANCHARD, OF PARIS, FRANCE.

GRAIN-ELEVATOR.

SPECIFICATION forming part of Letters Patent No. 590,084, dated September 14, 1897.

Application filed May 22, 1896. Serial No. 592,551. (No model.) Patented in France April 16, 1896, No. 255,612.

*To all whom it may concern:*

Be it known that I, EMILE BLANCHARD, a citizen of the Republic of France, now residing at Paris, France, have invented certain new and useful Improvements in Grain-Elevators, (for which I have obtained Letters Patent in France, dated April 16, 1896, No. 255,612,) of which the following is a full, clear, and exact description.

This invention relates more especially to continuously-acting apparatus for elevating grain, in which the grain is drawn up from any point in a vessel, for example, and delivered onto a wharf or other place by means of pneumatic propellers, which consist of air-tight chambers connected with suction and compression air pumps placed in any suitable position and of an automatic distributing apparatus so applied to the propellers as to assure the communication of each chamber in turn either with the air and grain suction pipes or with the compressed-air and grain-delivery pipes.

Figure 1:
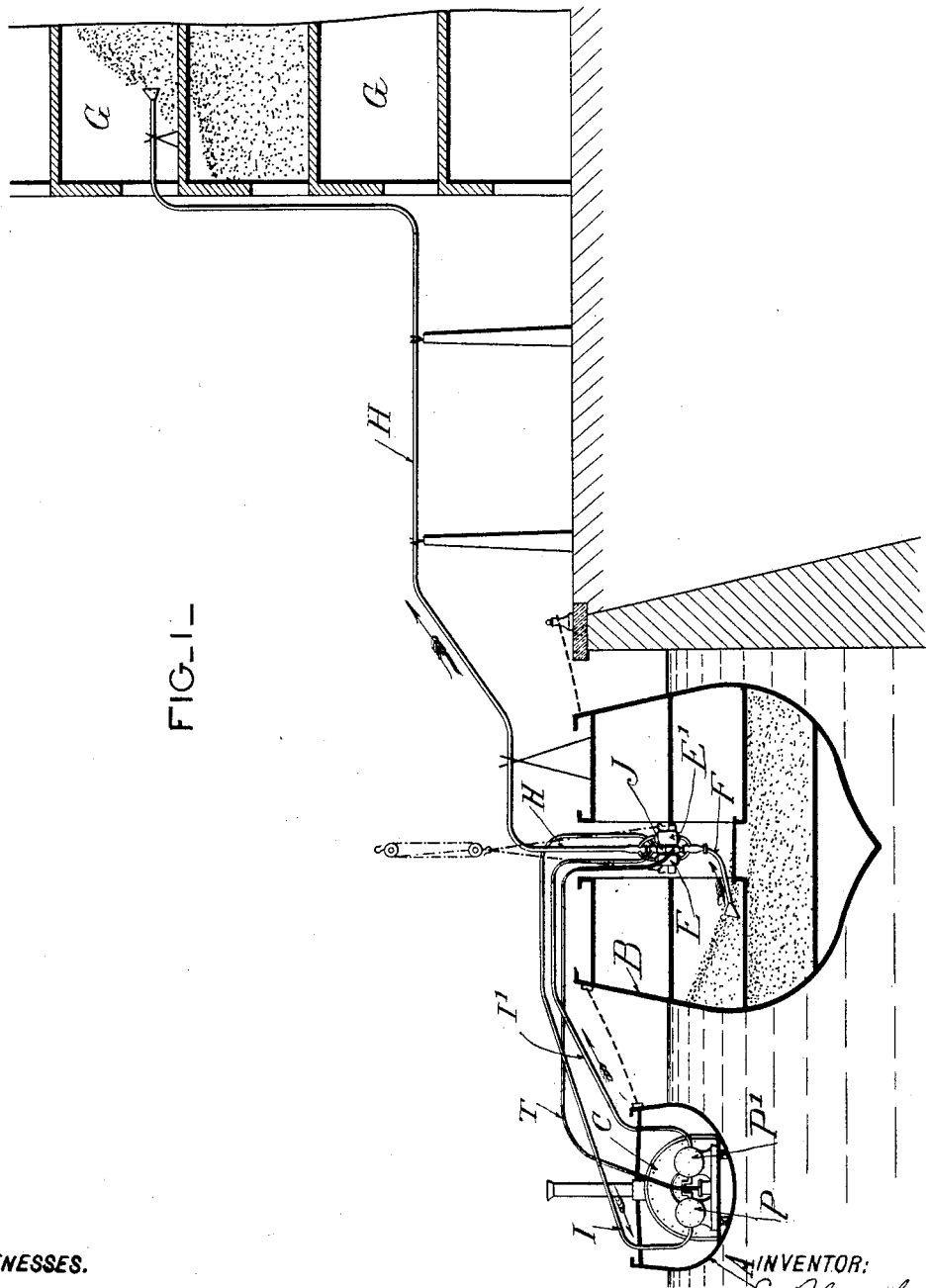
Figure 7:
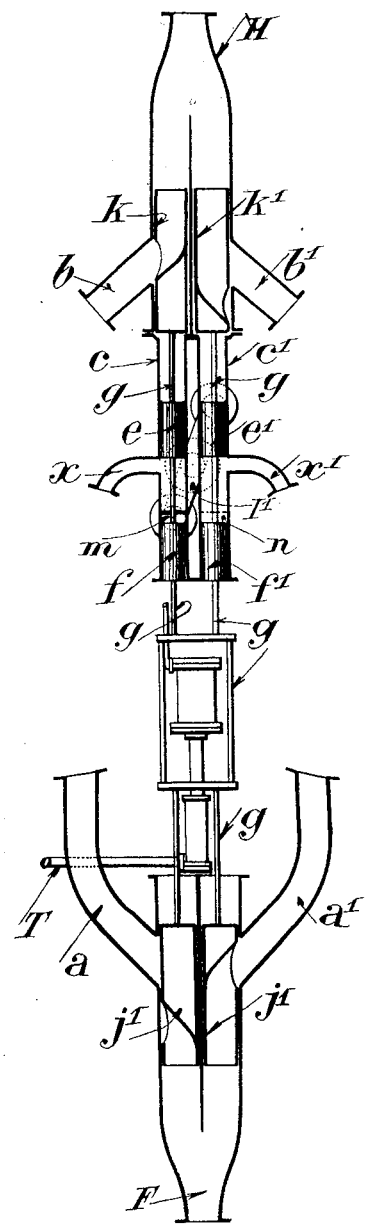
Figure 9:
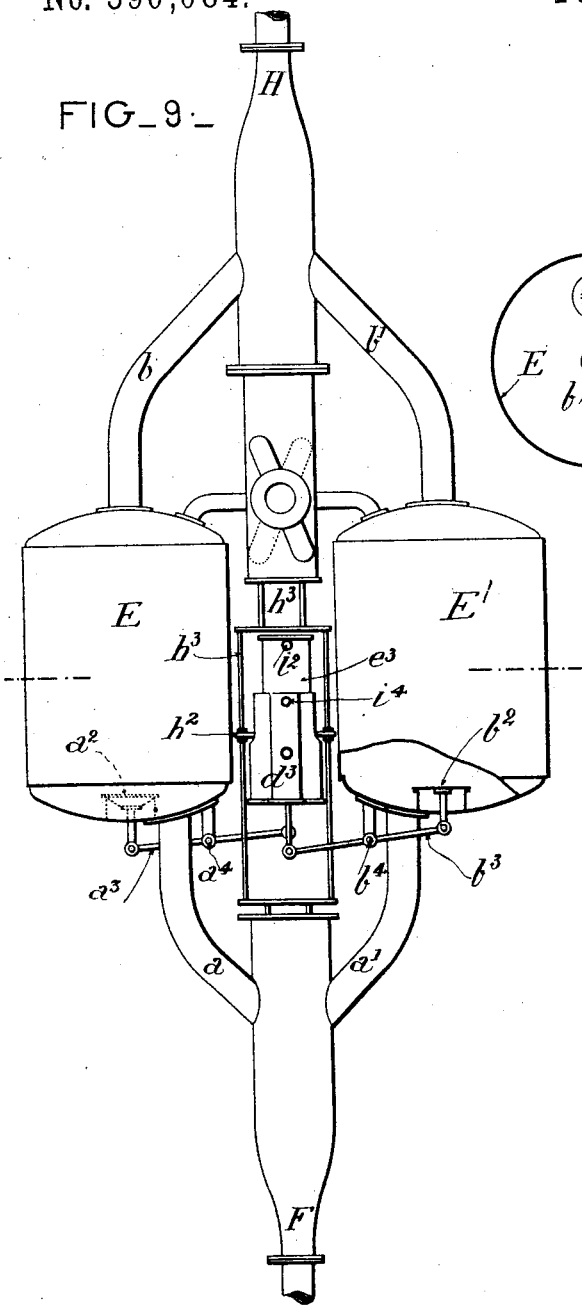
Figure 10:
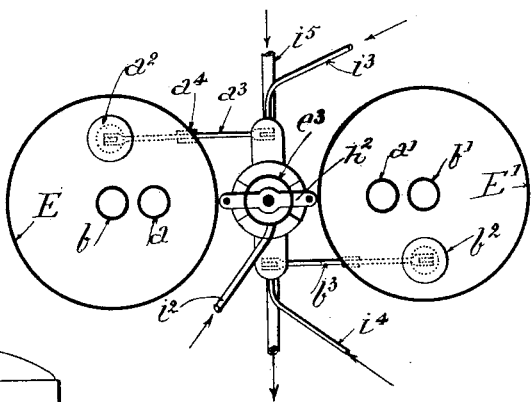
Figure 11:
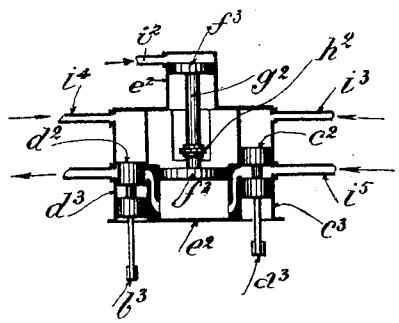

In the accompanying drawings, Figure 1 represents, diagrammatically, the general arrangement of an elevator constructed in accordance with my invention as applied to the unloading of a grain-ship. Fig. 2 is an elevation of the motive-power air-pumps coupled with hydraulic devices for actuating the distributing apparatus. Fig. 3 is a sectional plan of the pumps and hydraulic devices shown in Fig. 2. Fig. 4 is an end view of the hydraulic apparatus shown in Fig. 2. Fig. 5 is a sectional elevation of the "propeller," properly so called, with hydraulic distributing-gear. Fig. 6 is a plan of the apparatus shown in Fig. 5. Fig. 7 is a general view of the distributing apparatus. Fig. 8 is a side view of the propeller shown in Fig. 5. Fig. 9 is an elevation of a propeller somewhat different from that shown in Figs. 5 to 8 and in which the weight of the grain is utilized to actuate the distributing apparatus instead of the hydraulic gear. Fig. 10 is a plan of same. Fig. 11 is a diagrammatic longitudinal section of the motor-cylinders of the distributing apparatus shown in Figs. 9 and 10, and Figs. 12 and 13 represent a further modification of the distributing apparatus actuated by the weight of the grain.

Referring to Fig. 1, a tender A, moored to the vessel B to be unloaded, contains the motive-power engine C, which may be of any suitable kind, the air-pumps P and P', and any other pumps that may be necessary. On the vessel B, loaded with grain, is placed the elevator or "propeller," properly so called, E E', suspended at the requisite height by suitable tackle and communicating with the hold of the vessel by the suction-pipe F, with the storehouse G by the delivery-pipe H, and with the air suction and delivery pipes I and I' by means of the distributing apparatus J.

Referring now to Fig. 5, it will be seen that the elevator or propeller comprises, essentially, two air-tight chambers E and E' into which the grain is first drawn to be afterward delivered to the wharf or storehouse, two grain-suction pipes $a$ and $a'$, which unite into a single pipe F, two grain-delivery pipes $b$ and $b'$, which also unite into a single pipe H, and a distributing apparatus comprising two air-cylinders $c$ and $c'$ in communication with the chambers E and E', respectively, and with the air suction and delivery pipes I and I' and valves $j\ j'\ k\ k'$ between the chambers E E' and the grain-pipes F and H.

The air-cylinders $c$ and $c'$ contain the pistons $e\ e'\ f f'$, which effect the communication, according to their position, of one of the propeller-chambers E or E' with the suction-pipe I of the air-pumps, and of the other of the said chambers with the compressed-air-delivery pipe I', or vice versa. (See Figs. 5 to 8.)

The upward and downward movements of the air-pistons $e\ e'\ f f'$ are effected automatically either by means of hydraulic gear and compressed air or by means of compressed air and the weight of the grain with which the chambers E and E' are alternately filled. In the first case, Figs. 5 to 8, the pistons $e\ e'\ f f'$ are connected together by means of rigid rods $g$ to two pistons $h$ and $i$, fixed on one rod, one of which, $h$, is acted upon by hydraulic pressure and serves to raise the distributing apparatus, and the other, $i$, is acted on by air-pressure being in constant communication on its upper face with the compressed-air pipe I' and serves to force the distributing apparatus downward. The pistons $h\ i\ e\ e'\ f f'$ are connected to the valves $j\ j'\ k\ k'$, which alternately place each of the chambers E or E' in communication either with the grain-suction pipe F or with the grain-delivery pipe H.

The air suction and delivery pipes I and I' are connected to the two air suction and compression pumps P and P', Figs. 2 and 3, which are actuated by an intermediate shaft $o$, crank-disks $p$ and $p'$, and connecting-rods $q q'$.

The air-pump P exhausts the air alternately from each of the chambers E E' of the propeller and delivers it into the atmosphere, a strainer-box X being preferably provided to prevent dust from entering the pump. The compression-pump P' draws air from the atmosphere and compresses it alternately into each chamber of the propeller. The air-pumps shown in Figs. 2 to 4 are combined with hydraulic gear for operating the air and grain distributing apparatus. This gear is arranged as follows: The pump crank-shaft $o$ carries a spur-pinion $r$, which gears with teeth on a disk L, which it thereby causes to rotate. This disk has a cam-groove $s$, in which takes a friction-roller M, which by means of the slide N communicates a reciprocating motion to the piston or plunger $t$ of the water-pump cylinder $t'$. The pipe T, which forms the communication between the cylinders containing the pistons $t$ and $h$, respectively, is constantly full of water, so that for each descent of the piston $t$ the piston $h$ is raised and with it the whole apparatus for distributing air and grain to the chambers E and E'. When the piston $t$ rises in its cylinder $t'$, the compressed air which is constantly pressing on the upper face of the air-piston $i$ causes the whole distributing apparatus to descend.

To compensate for any loss of water from the pipe T or from the cylinders containing the pistons $t$ and $h$, a small pump Q, operated by an eccentric $Q'$, constantly forces water into the said pipe through the tube $Q^2$.

The action of the apparatus is as follows: Supposing the whole to be arranged as above described, that the air-pumps P P' are in action, and that the hydraulic piston $t$ has arrived at the top of its stroke, as seen in Fig. 2, the whole of the distributing apparatus E and E' being in its lowest position, as shown in Figs. 5 and 7, the chamber E is in communication with the air-delivery pipe I' through the pipe $x$, the cylinder $c$, and the orifice $m$. The chamber E' is in communication with the air-suction pipe I through the pipe $x'$, the cylinder $c'$, and the orifice $n$; so likewise the valve $j$ effects the communication of the chamber E' with the grain-suction pipe F, while the valve $k'$ closes the communication of that chamber with the grain-delivery pipe H, the valve $j'$ closes the communication between the chamber E and the grain-suction pipe F, while the valve $k$ effects communication between that chamber and the grain-delivery pipe H. It results then from this position of the movable parts—that is to say, of the air and grain distributing apparatus—that the grain is drawn from the vessel B into and fills the chamber E', while the grain already in the chamber E is forced into the storehouse G. The rotation of the disk L by the pump-shaft $o$ being continuous and the friction-roller M moving in the groove $s$, the hydraulic piston or plunger $t$ is forced downward in its cylinder $t'$ and forces the hydraulic plunger $h$ and with it, the whole distributing apparatus, upward. This effects a complete reversal of the distribution—that is to say, that the chamber E is now in communication with the air-suction pipe I and with the grain-suction pipe F, while the chamber E' is in communication with the compressed-air and the grain-delivery pipes I' and H. Consequently the chamber E becomes refilled with grain and the grain that filled the chamber E' is forced up into the storehouse. As the water-piston $t$ rises in its cylinder the pressure ceases below the hydraulic piston or plunger $h$, and the compressed air, which presses constantly on the air-piston $i$, causes the whole distributing apparatus to descend and the cycle of operations is repeated, the action of the apparatus being continuous and automatic so long as the air-pumps P P' and the water-piston $t$ are kept in motion.

Figs. 9 to 11 show a modification in which the distributing apparatus with its air-pistons and its grain-valves remains the same, as above described, but is actuated in a different way. The up-and-down movement is communicated in this case to the distributing apparatus by utilizing the weight of the grain which fills alternately the two chambers E and E' instead of by hydraulic gear. For this purpose each of the chambers E E' is furnished at the bottom with a diaphragm-piston $a^2$ or $b^2$, the rod of which is pin-jointed to the end of a lever $a^3$ or $b^3$, pivoted at $a^4$ or $b^4$, and pin-jointed itself at its other end to the rod of a slide $c^2$ or $d^2$. The slides $c^2$ $d^2$ are free to move in their respective cylinders $c^3$ and $d^3$, which are placed at each side of a cylinder of two diameters $e^2$ $e^3$, with a hollow chamber between them. In the cylinders $e^2$ $e^3$ are fitted differential pistons $f^2$ $f^3$, fixed on one rod $g^2$, which is rigidly connected by a cross-bar $h^2$ and rods $h^3$ $h^3$, or by other suitable means to the air-pistons and grain-obturators. Finally the compressed air taken from the main compressed-air pipe I' is led to the upper or smaller part $e^3$ of the cylinder by the pipe $i^2$ to the upper part of the slide boxes or cylinders $c^3$ $d^3$ by the pipes $i^3$ and $i^4$ and to the admission-pipe $i^5$. The weight of the grain acting on the diaphragms $a^2$ or $b^2$, as the case may be, causes the corresponding lever $a^3$ or $b^3$ to oscillate and produce alternately the escape or admission of air from or to the lower face of the larger piston $f^2$, which results in a to-and-fro motion of the whole distributing apparatus, the slides $c^2$ $d^2$ being returned to their lower position by the pressure of the compressed air acting at the upper part of their boxes or cylinders.

Instead of employing for the air and grain distribution into the chambers E E' piston-valves connected rigidly to each other I sometimes employ cocks or valves 1 2 3 4 1' 2' 3' 4', as shown in Fig. 12, placed in the pipes $a$ $b$ $l^2$ $m^2$ $a'$ $b'$ and operated automatically by means of connecting-rods and crank-disks IV II III in the same manner as the well-known Corliss valves. The pipes $l^2$ $m^2$ form air-chambers which are equivalents of the air-cylinders $c$ $c'$ in the other forms of construction. The up-and-down motion is communicated to a longitudinal rod $t^2$ by one of the methods above described—that is to say, either by means of hydraulic gear and compressed air or by compressed air and the weight of the grain. On this rod $t^2$ are jointed at suitable points the three connecting-rods $u^2$ $v^2$ $x^2$, which actuate the aforesaid crank-disk, from which motion is communicated to the various connecting-rods jointed to the spindles of the said cocks or valves.

Inspection of Fig. 12 shows clearly that the operation of the cocks will effect the distribution into the chambers E and E' in a manner analogous to that effected by the piston-valves the action of which has been described above.

I do not confine myself to the precise arrangements and details herein described, as they may be varied according to circumstances without departing from the nature of my invention.

It is obvious that the elevator herein described may be employed not only for unloading grain, cereals, or other analogous substances from vessels, but that it is also applicable to transporting such substances from one place to another, as from one storehouse to another, and so forth.

I claim—

1. A pneumatic elevator or transporter for grain and other material, comprising two receptacles or chambers adapted to receive the material, an inlet-pipe and an outlet-pipe for conveying the material to and from each receptacle, and a pneumatic apparatus for alternately exhausting the air from each of the receptacles and forcing it into said receptacles, substantially as described.

2. A pneumatic elevator or transporter for grain and other material, comprising two receptacles or chambers adapted to receive the material, an inlet-pipe and an outlet-pipe for conveying the material to and from each receptacle, and a pneumatic apparatus so connected to the two receptacles as to compress the air within one of them and at the same time exhaust the air from the other, substantially as described.

3. A pneumatic elevator or transporter for grain and other material, comprising two receptacles or chambers adapted to receive the material, an inlet-pipe and an outlet-pipe for conveying the material to and from each receptacle, a separate air-inlet and air-outlet for each receptacle, and a pneumatic apparatus connected to said air-inlets and air-outlets and arranged to alternately exhaust the air from said receptacles and compress it therein, substantially as described.

4. The combination of the two receptacles, and the inlet and outlet pipes for conveying the material to and from the said receptacles, with separate pipes for conveying air to and from the receptacles and adapted for connection with a pneumatic apparatus, substantially as described.

5. The combination of a receptacle, inlet and outlet pipes for conveying the material to the said receptacle, a suction-pump for exhausting the air from the receptacle, a compression-pump for forcing air into the receptacle, and a valve or distributing device for alternately connecting the receptacle to the suction-pump and to the compression-pump, substantially as described.

6. The combination of the two receptacles, and the inlet and outlet pipes for conveying the material to and from the said receptacles, with separate pipes for conveying air to and from the receptacles and adapted for connection with a pneumatic apparatus, and a valve or distributing device for connecting one receptacle with the air-suction pipe while the other receptacle is connected with the air-delivery pipe, substantially as described.

7. The combination of the receptacle, the inlet and outlet pipes for conveying the material to and from the said receptacle, the air-chambers or air-cylinders connected to said receptacle and adapted for connection respectively to an air-compressor and an exhauster, and a valve or distributing device for alternately connecting the receptacle with the said air-chambers, substantially as described.

8. The combination of the receptacle, the inlet and outlet pipes for conveying the material to and from the said receptacle, an air-suction pipe and an air-delivery pipe likewise connected to the said receptacle, a valve or distributing device for alternately connecting the receptacle to the air-suction pipe and to the air-delivery pipe, and an actuating device, operated by fluid-pressure for moving said valve, substantially as described.

9. The combination of the receptacle, the inlet-pipe and the outlet-pipe for conveying the material to and from the said receptacle, the inlet-pipe and outlet-pipe for conveying air to and from said receptacle, connected valves arranged in said pipes, and mechanism for operating said valves, substantially as described.

10. The combination of the receptacle, the inlet-pipe and the outlet-pipe for conveying the material to and from the said receptacle, the inlet-pipe and outlet-pipe for conveying air to and from said receptacle, connected valves arranged in said pipes, a piston connected to said valves, a connection from the air-inlet pipe to one face of the piston, and a hydraulic-pressure apparatus connected to the other face of the piston, substantially as described.

In witness whereof I have hereunto set my hand in presence of two witnesses.

EMILE BLANCHARD.

Witnesses:
R. LUZERNE,
EUGENE WALBOA.